US012513262B2

(12) United States Patent
Shayne et al.

(10) Patent No.: US 12,513,262 B2
(45) Date of Patent: Dec. 30, 2025

(54) VIDEO CONFERENCE INTERRUPTION PREDICTION

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 414 days.

(21) Appl. No.: 17/979,076

(22) Filed: Nov. 2, 2022

(65) Prior Publication Data

US 2023/0133750 A1 May 4, 2023

Related U.S. Application Data

(60) Provisional application No. 63/274,985, filed on Nov. 3, 2021.

(51) Int. Cl.
*H04N 7/15* (2006.01)
*H04L 12/18* (2006.01)
*H04N 7/14* (2006.01)

(52) U.S. Cl.
CPC ......... *H04N 7/152* (2013.01); *H04L 12/1822* (2013.01); *H04N 7/147* (2013.01)

(58) Field of Classification Search
CPC ..... H04N 7/152; H04N 7/147; H04L 12/1822
See application file for complete search history.

(56) References Cited

U.S. PATENT DOCUMENTS

| | | | |
|---|---|---|---|
| 2003/0103075 A1* | 6/2003 | Rosselot | H04L 41/22 348/E7.083 |
| 2021/0245656 A1* | 8/2021 | Weldemariam | G06V 20/56 |
| 2021/0385412 A1* | 12/2021 | Matula | H04N 7/15 |
| 2022/0141396 A1* | 5/2022 | Ruan | H04M 3/567 348/239 |

FOREIGN PATENT DOCUMENTS

WO WO-2021242510 A1 * 12/2021 ......... H04L 12/1822

* cited by examiner

*Primary Examiner* — Duc Nguyen
*Assistant Examiner* — Carissa A Jones
(74) *Attorney, Agent, or Firm* — Fish & Richardson P.C.

(57) ABSTRACT

Methods, systems, and apparatus, including computer programs encoded on computer storage media, for predictive video conference actions. One of the methods includes accessing, for a video conference in progress in an area of a property, data indicating activity at the property; predicting, using the data indicating activity at the property, that a video conference interruption is likely to occur; and in response to determining that a video conference interruption is likely to occur, performing one or more actions to reduce a likelihood that the video conference interruption will be presented during the video conference.

20 Claims, 6 Drawing Sheets

VIDEO CONFERENCE INTERRUPTION PREDICTION

CROSS-REFERENCE TO RELATED APPLICATION

This application claims the benefit of U.S. Provisional Application No. 63/274,985, filed Nov. 3, 2021, the contents of which are incorporated by reference herein.

TECHNICAL FIELD

This disclosure application relates generally to monitoring systems.

BACKGROUND

Many properties are equipped with property monitoring systems that include sensors and connected system components. Property monitoring systems can receive and analyze data from sensors throughout a property.

SUMMARY

Systems and methods for conference interruption prediction and prevention and response are disclosed. A property monitoring system can use the disclosed techniques to monitor audio and video conferences. The disclosed techniques can be used to detect and predict conference interruptions, distractions, and participant fatigue. The disclosed techniques can also be used to prevent and mitigate conference interruptions, distractions, and participant fatigue.

Webcams used for video conferencing can be used to monitor conference participants. Webcams are often positioned very close to the participant and are typically aimed at the participant's face. Camera images from webcams can be used to monitor participant characteristics and behavior such as eye-tracking and facial expression. Camera image data from webcams can be used to detect signs of video-conference fatigue and distraction. Based on detecting fatigue or distraction, a monitoring system can perform actions to reduce the fatigue or distraction.

Video conferences can be impacted by distractions from roommates, children, spouses, pets, etc. Sensors at properties where videoconferences take place can be used to predict conference interruptions. Based on predicting a conference interruption, a monitoring system can perform actions to prevent or mitigate the conference interruption.

In general, one innovative aspect of the subject matter described in this specification can be embodied in methods that include the actions of accessing, for a video conference in progress in an area of a property, data indicating activity at the property; predicting, using the data indicating activity at the property, that a video conference interruption is likely to occur; and in response to determining that a video conference interruption is likely to occur, performing one or more actions to reduce a likelihood that the video conference interruption will be presented during the video conference.

In general, one innovative aspect of the subject matter described in this specification can be embodied in methods that include the actions of accessing, for a video conference in which a user is participating, data indicating characteristics of the video conference; determining, using the characteristics of the video conference, that the user is likely experiencing fatigue during the video conference; and in response to determining that the user is likely experiencing fatigue, performing one or more actions.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the method can include accessing data indicating that the video conference is in progress in the area of the property, wherein accessing the data indicating the activity at the property is responsive to accessing the data indicating that the video conference is in progress in the area of the property.

In some implementations, the method can include performing the one or more actions to reduce the likelihood that the video conference interruption will be presented during the video conference including performing one or more actions that have at least a threshold likelihood of preventing the video conference interruption.

In some implementations, the method can include performing the one or more actions including sending an instruction to a smart device to cause the smart device to reduce the likelihood of the video conference interruption.

In some implementations, the method can include sending the instruction to the smart device including sending the instruction to a network connected door to cause the door to lock to reduce a likelihood of the video conference interruption.

In some implementations, the method can include performing the one or more actions to reduce the likelihood that the video conference interruption will be presented during the video conference including deactivating at least one sensor used for the video conference.

In some implementations, the method can include deactivating the at least one sensor including deactivating one of a camera or a speaker for the video conference.

In some implementations, the method can include predicting that the video conference interruption is likely to occur including: determining, using the data indicating activity at the property, a predicted path of a person at the property; and predicting, using the predicted path of the person at the property, that the video conference interruption is likely to occur.

In some implementations, the method can include performing the one or more actions to reduce the likelihood that the video conference interruption will be presented during the video conference including performing one or more actions to reduce a likelihood that the video conference interruption will be presented audibly or visibly during the video conference.

In some implementations, the method can include performing the one or more actions to reduce the likelihood that the video conference interruption will be presented during the video conference including: determining, for each of a plurality of actions, an action likelihood that the action will reduce the likelihood that the video conference interruption will be presented during the video conference; and selecting, using the plurality of action likelihoods, the one or more actions to perform.

In some implementations, the method can include determining that a user is participating in a video conference, wherein accessing the data indicating the characteristics of the video conference is responsive to determining that the user is participating in the video conference.

In some implementations, the method can include accessing the data indicating the characteristics of the video conference including: accessing data for at least one of video or audio for the video conference; and determining, using at least one of the video or the audio of the video conference, data indicating characteristics of the user during the video conference.

In some implementations, the method can accessing the data indicating the characteristics of the video conference including accessing at least one of microphone data, speaker data, or camera data for the video conference.

In some implementations, the method can include determining a likely source of the fatigue of the user, wherein performing the one or more actions including performing the one or more actions to mitigate the likely source of the fatigue of the user.

In some implementations, the method can include determining a time difference between when input data is captured for the video conference and output data is presented for the video conference; and determining whether the time difference satisfies a difference threshold, wherein: performing the one or more actions is responsive to determining that the time difference satisfies the difference threshold.

In some implementations, the method can include performing the one or more actions including causing a modification to the video conference in response to determining that the user is likely experiencing fatigue.

In some implementations, the method can include determining that a number of people participating in the video conference who are likely experiencing fatigue satisfies a threshold number, wherein: performing the one or more actions is responsive to determining that the number of people participating in the video conference who are likely experiencing fatigue satisfies the threshold number.

The subject matter described in this specification can be implemented in various implementations and may result in one or more of the following advantages. In some implementations, the systems and methods described in this specification can reduce computational resource usage by reducing, or eliminating, processing by a microphone, a camera, or both, of video conference interruptions that would otherwise be processed by the corresponding device. In some implementations, the systems and methods described in this specification can reduce the length of video conferences, thus reducing the amount processing used to conduct conferences. Some implementations can improve the efficacy and pleasantness of a conference by reducing fatigue and distraction; prevent embarrassing interruptions or breaches of privacy caused by unintended capture of background activities; or both. Some implementations can prevent disruption or distraction for other video conference members.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
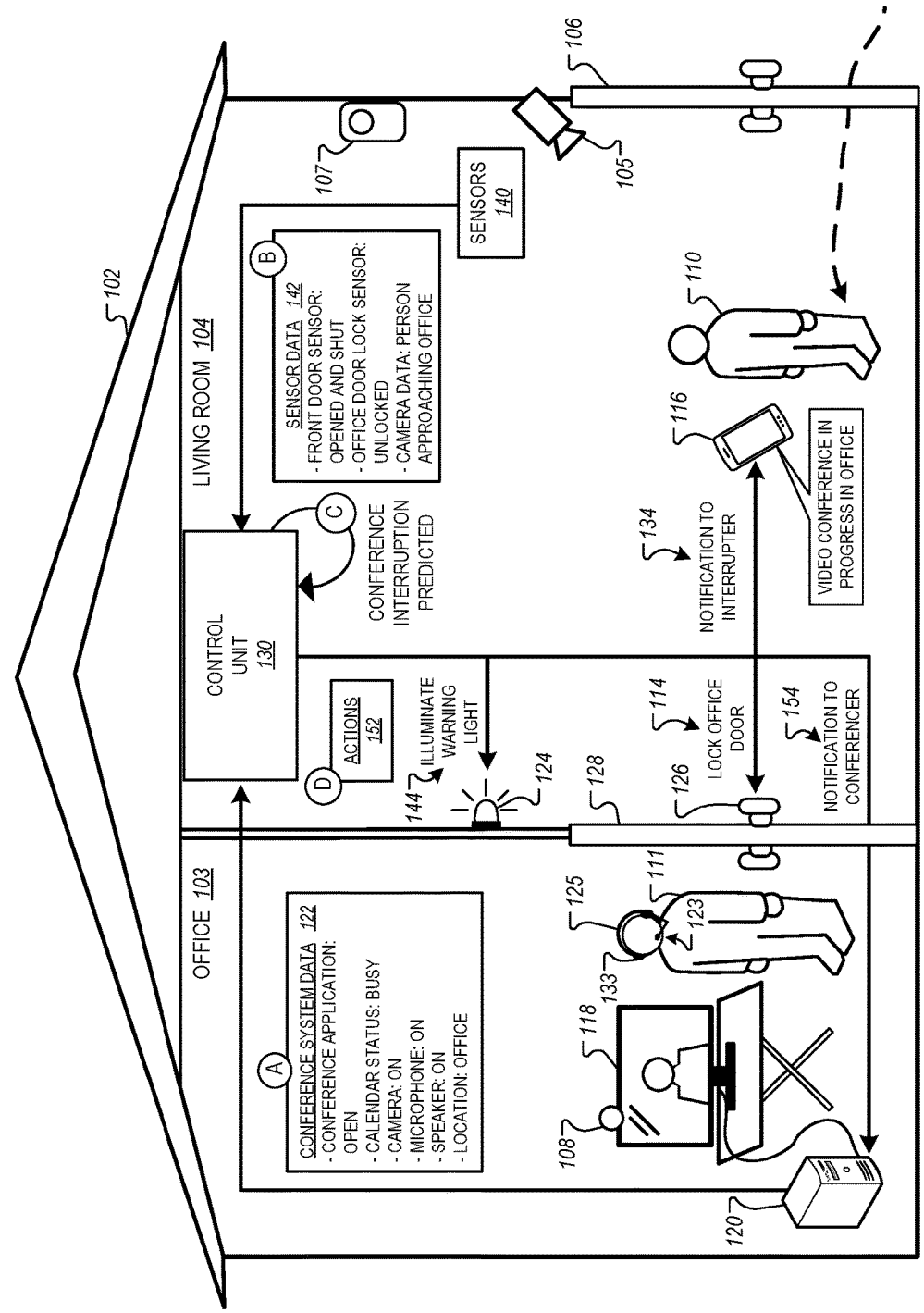
FIG. 1 is a diagram illustrating an example diagram illustrating an example property monitoring system for predicting and preventing conference interruptions.

FIG. 1 is a diagram illustrating an example property monitoring system 100 for predicting and preventing conference interruptions. The property 102 can be, for example, a school property, an office property, a residential property, a multiple dwelling unit, an apartment complex, etc.

The property includes a first room, e.g., office 103, and a second room, e.g., living room 104. A conferencer 111 is participating in a conference using computing system 120. The conference can be a communication session using audio, video, or both. In the example of FIG. 1, the conferencer 111 is participating in a videoconference using audio and video. The conferencer 111 views video on a screen 118 of the computing device. The conferencer 111 listens to audio of the conference using an audio device, e.g., speakers of a headset 125. The conferencer 111 participates in the conference by speaking into a microphone 123 of the headset 125. Images of the user are captured by a webcam 108. The images of the conferencer 111 are visible to participants of the conference.

Although shown in FIG. 1 as being part of a headset 125, the microphone 123 and the speakers can each be a separate device. In some examples, the microphone 123, the speakers, or both can be integrated into the computing device, e.g., as components of a laptop computer.

The microphone 123 and webcam 108 can be operated by the conferencer 111. For example, the conferencer 111 can switch the microphone 123 and/or the webcam 108 on or off by operating a switch of the headset 125 and/or a switch attached to the webcam 108. In some examples, the conferencer 111 can switch the microphone 123 and/or the webcam 108 on and off by selecting an option on an interface displayed on the screen 118. In some examples, the conferencer 111 can adjust settings of the webcam 108 and/or the microphone 123. For example, the conferencer 111 can adjust a tilt or zoom of the webcam 108, and can adjust a volume of the microphone 123. In some examples, the computing system 120 can switch on and off the microphone 123 and/or the webcam 108. For example, the computing device may switch off the microphone 123 and/or the webcam 108 when the conferencer 111 first joins the conference.

The monitoring system 100 can perform conference interruption prediction and prevention at the property 102 using sensors 140 throughout the property 102. The sensors can include, for example, motion sensor 107 and camera 105 at the property 102. The sensors can also include door position sensors for the doors 106, 128. The door position sensors can include, for example, physical contact sensors that detect whether a door is open or shut. The sensors can also include door lock sensors that detect whether a door is locked or unlocked.

Conference interruption prediction and prevention can include using the sensors to monitor the activities or anomalies that are detected at the property 102. Based on the activities detected and tracked by the sensors at the property 102, the monitoring system 100 can perform one or more actions. The monitoring system 100 can perform actions to mitigate the interruption, to prevent the interruption, to assist the interruption, or any combination of these.

In some examples of the monitoring system assisting the interruption includes the monitoring system 100 predicting that a particular interruption satisfies a likelihood threshold of occurring. In response, the monitoring system 100 can determine that additional information might be necessary for the interruption, e.g., when a child is likely going to ask to watch a television show. In these examples, the monitoring system 100 can prompt the interrupter for additional information and provide the additional information to a conference participant. In this way, assisting an interruption can also potentially mitigate the interruption.

The system 100 can include at least one local network. The network can be any communication infrastructure that supports the electronic exchange of data between a control unit 130 and other components of the monitoring system. For example, the network may include a local area network (LAN). The network may be any one or combination of wireless or wired networks and may include any one or more of Ethernet, Bluetooth, Bluetooth LE, Z-wave, Zigbee, or Wi-Fi technologies. In some examples, the property 102 includes a network, and sensors throughout the property 102 communicate with the control unit 130 over the network.

The sensors can transmit the sensor data to the control unit 130 via the network. Example sensor data can include indoor and outdoor motion sensor data, images and video analysis data from security cameras, and door and window position and lock data. The control unit 130 can collect and assess the data from the sensors to monitor the conditions of the property 102.

The control unit 130 may be, for example, one or more computer systems, server systems, or other computing devices that are located at or near the property 102 and that are configured to process information related to the monitoring system at the property 102. In some implementations, the control unit 130 is a cloud computing platform. The control unit 130 can be, for example, a computer system or other electronic device configured to communicate with the sensors. The control unit 130 can also perform various management tasks and functions for the monitoring system. In some implementations, a resident, a visitor, or another user can communicate with the control unit 130 (e.g., input data, view settings, or adjust parameters) through a physical connection, such as a touch screen or keypad, through a voice interface, or over a network connection.

In some examples, the control unit 130 can control the microphone 123 and/or the webcam 108. For example, the control unit 130 can transmit commands to the computing system 120. The commands can cause the microphone 123 and/or the webcam 108 to turn on and off. The control unit 130 can communicate with the microphone 123, the webcam 108, or both, over the local network.

In some examples, the control unit 130 analyzes some or all of the sensor data. For example, the control unit 130 can analyze motion sensor data, video images, and microphone 123 data to determine the occupancy of the properties of the property 102. The control unit 130 can also analyze sensor data to determine locations of the residents and/or other occupants within the property 102. The control unit 130 can use the occupancy data, location data, or both, to aid in preventing a conference interruption.

The monitoring system 100 includes one or more sensors located at the property 102 that collect sensor data related to the property 102. The monitoring system 100 has the ability to control various sensors and other devices on the property 102 through automation controls. The sensors of the monitoring system collect various sensor data from the property 102. Example sensors can include cameras, motion sensors, microphones, thermometers, smoke detectors, and water meters. The sensors can also include position sensors and lock sensors for doors and windows at the property 102.

An example sensor at the property 102 is a camera 105. The camera 105 may be used to monitor people, vehicles, and animals at the property 102. In some implementations, the camera 105 may perform video analysis on the images captured by the camera 105. In some implementations, the camera 105 may transmit images to a control unit 130 and the control unit 130 may perform video analysis on the images. The camera 105 and/or the control unit 130 may perform video analysis on the images to detect and identify objects and/or perform facial recognition within the field of view of the camera 105. For example, the camera 105 may detect and identify animals, vehicles, and people.

The camera 105 can include any type of camera. The cameras can capture images of the interior and exterior areas of the property 102. The images can be generated from any appropriate type of light. For example, the images can be generated from any combination of visible light, IR light, or UV light. The images can also be generated from RADAR, LIDAR, and/or microwave imaging.

In some examples, the control unit 130 includes a property model database. The database stores a virtual property model of the property 102. In some examples, the property model database can store virtual models of multiple properties.

The property model can include a two-dimensional (2D) map, a three-dimensional (3D) map, or both, of the property 102. For example, the property model can include a floor plan of each floor of the property 102. The property model can include a map of sensors of each of the properties of the property 102. For example, the property model can include a position of the camera 105 indicated on the map of the property 102. The property model can include data indicating a sensor area of each sensor. The sensor area of a sensor can include, for example, a maximum range of the sensor, a field of view of the sensor, an area or volume of the property that is within detection range of the sensor, etc. For example, the property model can include data indicating a 2D or 3D field of view of the camera 105. The field of view of the camera 105 can be overlaid on the map of the property 102.

The property model can include a map of devices at each of the properties of the property 102. For example, the property model can include a position of doors, windows, locks, alarms, lights, speakers, etc. The property model can include, e.g., a location of the camera 105 at the property 102 and a location of the computing system 120 at the property 102. The devices can include automated devices, e.g., devices that can be operated by the control unit 130 using automated controls. Automated devices can include, for example, the camera 105, a warning light 124, a door lock 126, the microphone 123, and the webcam 108.

The property model can be generated at or after a time when the property 102 is registered with the monitoring service. For example, when a manager or owner of the property 102 registers the property 102 with the monitoring service, the manager or another user can provide information to the control unit 130 indicating a layout of the property, locations of sensors, types of sensors, etc. In some examples, the manager can provide the information to the control unit 130 through a user interface of a computing system. In some examples, the manager can provide the information to the monitoring service by recording or streaming a video walk-through of the property 102 to the control unit 130.

In some examples, the control unit 130 can update the property model over time. For example, the control unit 130 can update the property model based on sensor data 142 collected at the property 102 over time. In some examples, the control unit 130 can update the property model based on user input. As an example, a user may reposition the camera 105 at the property 102. The control unit 130 can update the property model based on user input indicating the updated position of the camera 105. In some cases, the control unit 130 can detect movement of the camera 105, and can prompt the user to input an updated position of the camera 105. In some cases, the control unit 130 can detect movement of the camera 105, and can automatically update the position of the camera 105 in the property model based on camera images collected from the camera 105.

FIG. 1 illustrates a flow of data, shown as stages (A) to (D), which can represent steps in an example process. Stages (A) to (D) may occur in the illustrated sequence, or in a sequence that is different from the illustrated sequence. For example, some of the stages may occur concurrently.

In the example scenario illustrated in FIG. 1, a conferencer 111 is participating in a conference in the office 103. A person 110 enters the living room 104 of the property 102 through the door 106 of the property 102. The person 110 approaches the door 128 to the office 103.

In stage (A) of FIG. 1, the control unit 130 receives conference data from the computing device. For example, the conference system data 122 can include a status of the microphone 123, the webcam 108, and the speakers. The conference system data 122 can also include a status of conferencing software indicating that a conference is in progress. In some examples, the conference data can include image data captured by a camera in the office. The camera can be the webcam 108 or another camera. The image data may depict the conferencer 111 looking in the direction of the screen 118. The image data may also include images of one or more conference participants depicted on the screen 118.

The conference system data 122 can include audio data captured by a microphone in the office. The microphone can be the microphone 123 of the headset 125 or another microphone. The audio data may include audio of the conferencer 111 speaking. In some examples, the audio data may include audio of another conference participant speaking. The control unit 130 can determine, based on the conference system data 122, that a conference is in progress in the office.

In some examples, based on determining that the conference is in progress in the office, the control unit 130 can monitor for possible interruptions. For example, the control unit 130 can receive and analyze sensor data 142 from sensors at the property 102 to predict interruptions.

In stage (B) of FIG. 1, sensors 140 send sensor data 142 to a control unit 130. The control unit 130 receives the sensor data 142 from the sensors 140 at the property 102. The sensors 140 can include, for example, motion sensors, cameras, microphones, temperature sensors, humidity sensors, door and window lock sensors, door and window position sensors, etc.

In the example of FIG. 1, the sensor data 142 includes door lock data indicating that the door 128 is unlocked and door position data indicating that the door 106 opened and shut. The sensor data also includes camera image data from camera 105. The camera image data depicts the person 110 entering the property through the door and moving through the property towards the office 103. In some examples, the sensor data 142 can also include results of image analysis of the images captured by the camera 105. The results of the image analysis can indicate, for example, that the door 106 opened and shut and that the person 110 is walking across the living room 104.

In some examples, cameras at the property 102 can analyze captured images, e.g., using video analytics. For example, the camera 105 can perform video analysis on the images to classify objects within the images. The cameras may identify and classify the person 110 within the images. The cameras can also perform object tracking of the person 110 as the person 110 travels across the property 102.

In some examples, cameras at the property 102 can transmit image data to the control unit 130, and the control unit 130 can perform video analysis on the image data. For example, the camera 105 can capture an image of the person 110 and transmit the image to the control unit 130. The control unit 130 can perform video analysis in order to classify the object in the image as a person, to determine a direction of motion of the person, to perform facial recognition of the person 110, etc.

The control unit 130 can track movement of objects around the property based on the sensor data. For example, the control unit can track movement of people and animals around the property. In some examples, the control unit 130 can identify people at the property 102. For example, the control unit 130 can perform facial or voice recognition to identify a person 110 at the property and can track movements of the person 110. In some examples, the control unit 130 can identify and/or differentiate people at the property based on characteristics of the people. For example, the control unit can determine whether the person 110 is an adult or a child based on characteristics such as the height of the person 110.

The sensor data 142 can include timestamps associated with the data. The timestamps can indicate a time that the data was generated by the sensors or a time that the data was sent to the control unit. For example, the door position data can be associated with a timestamp of 1:15:30 pm. The image data including the person 110 walking through the living room 104 can be associated with a timestamp of 1:16:00 pm.

In some examples, the control unit 130 can send the conference system data 122, the sensor data 142, or both to a monitoring server over a long-range data link. The long-range data link can include any combination of wired and wireless data networks. For example, the control unit 130 can exchange information with the monitoring server through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the control unit 130 and the monitoring server is a secure data link (e.g., a virtual private network) such that the data exchanged between the control unit 130 and the monitoring server is encoded to protect against interception by an adverse third party.

In stage (C) of FIG. 1, the control unit 130 assesses activities at the property 102 based on the sensor data 142. The control unit 130 can analyze the sensor data 142 to determine conditions at the property 102.

The control unit 130 can determine, based on the sensor data, that an interruption is likely to occur. For example, the control unit can determine that the person 110 is approaching the door 128 to the office, and that the door 128 is unlocked. Based on determining that the person 110 is approaching the unlocked door 128, the control unit can predict that the person 110 is likely to interrupt the conference by entering the office 103.

In some examples, the control unit 130 can determine a confidence that the interruption will occur. The control unit 130 can determine the confidence based on the sensor data. For example, the control unit 130 may determine a confidence of fifty percent that the interruption will occur based on the person 110 entering the property 102 through the door 106. The control unit 130 may determine a higher confidence, e.g., of sixty percent, based on the person 110 approaching the door 128 to the office.

In some examples, the control unit 130 can predict a time that the interruption will occur. For example, the control unit 130 can determine that the person 110 entered the property 102 at 1:15:30 pm and can predict that the interruption will occur at 1:16:30 pm.

The control unit 130 uses the property model and the sensor data 142 to assess an interruption level of different areas of the property 102. The control unit 130 outputs an interruption assessment to the control unit 130. The control unit 130 determines one or more actions 152 to perform based on the predicted interruption.

The control unit 130 determines the interruption assessment based on the sensor data 142. For example, the control unit 130 can receive the sensor data 142 generated from sensors at the property 102. In response to receiving the sensor data 142 from the sensors at the property 102, the control unit 130 can retrieve the property model of the property 102 from the property model database. The control unit 130 can map the sensor data 142 to the property model. For example, the control unit 130 can map the audio data of sensor data to the property 102. In some examples, the control unit 130 can map the audio data of sensor data to a particular area of the property 102 based on the location of a motion sensor. For example, the control unit 130 can map motion sensor data to a particular room, floor, hallway, stairway, etc. of the property 102 based on the detection range of the motion sensor.

Based on the sensor data 142, the control unit 130 can determine that an interruption exists at the property 102 and can classify the interruption. For example, based on the door 106 opening and shutting, the control unit 130 can determine that a potential interruption exists at the property 102. In some examples, the control unit 130 can detect and classify activities using programmed rules. In some examples, the control unit 130 can detect and classify activities using machine learning algorithms. The machine learning algorithms can be trained using supervised or unsupervised methods. The control unit 130 can update machine learning parameters over time based on sensor data and interruption events detected at the property 102 and other properties.

In some examples, the control unit 130 can evaluate a likelihood or confidence that an interruption exists at the property 102. The control unit 130 can update the confidence of the interruption based on additional sensor data. For example, based on the door position data indicating the door 106 opened and shut, the control unit 130 may determine a confidence of sixty percent that a potential interruption exists at the property 102. Based on the image of the person 110 walking across the living room 104, the control unit may determine an updated confidence of eighty percent that a potential interruption exists at the property 102.

In some examples, the control unit 130 can determine the confidence that an interruption exists at the property 102 based on confidence levels of the sensor data. The control unit 130 can determine a confidence that the interruption exists at the property 102 based on a combination of confidence levels of different sensor data. The combination can include, for example, a weighted sum or a weighted average of confidence levels.

In stage (D) of FIG. 1, the control unit 130 determines to perform monitoring system actions 152 and performs the actions 152 based on detecting that an interruption is likely to occur. In some examples, the control unit 130 can perform actions based on the confidence of the interruption exceeding a threshold confidence value. For example, the threshold confidence value may be seventy percent. The control unit 130 may determine, based on the sensor data, that the confidence value of the interruption occurring is eighty percent. Based on determining that the confidence value of eighty percent exceeding the threshold confidence value of seventy percent, the control unit 130 can determine to take one or more actions.

The actions 152 can be performed, for example, to warn the person 110 that a conference is in progress, prevent the person 110 from entering the office, to prevent the presence of the person 110 from interrupting the conference, to warn the conferencer 111 of the predicted interruption, and/or to minimize disruption to the conference caused by the person 110.

The actions can include providing a single-click shortcut option for the conferencer 111 to be able to quickly turn off both the webcam 108 and microphone 123. This action can also include a customizable placeholder to be shown to other conference participants in place of the image of the conferencer 111, for example, a message stating "Conferencer will return shortly."

In some examples, the control unit 130 can determine that a person or animal is attempting to get the attention of the conferencer 111. For example, the control unit 130 can determine that a person is attempting to get the attention of the conferencer 111 based on image data showing the person waving their hands, based on microphone data indicating shouting sounds, etc. In these cases, the control unit 130 can perform actions to notify the conferencer 111 of the attention seeker and can provide the conferencer 111 with a shortcut to disable the microphone 123 and webcam 108.

The control unit 130 determines monitoring system actions 152 based on the predicted interruption. The control unit 130 can determine monitoring system actions 152 based on pre-programmed settings and rules. Rules and settings can be customizable and may be programmed, e.g., by an owner, resident, an installer, an operator, or another user of the monitoring system. For example, a rule may state that the control unit 130 sends a notification 154 to the conferencer 111 when a confidence of a conference interruption exceeds sixty percent. In some examples, a rule may state that the control unit 130 shuts and locks the door 128 when a confidence of a conference interruption exceeds seventy percent.

In some examples, the control unit 130 may be programmed to request permission from a user, e.g., conferencer 111 or person 110, before adjusting a device at the property 102. For example, the control unit 130 can send a command to the computing system 120 that causes the computing system 120 to display, on the screen 118, a recommendation perform an action, and selectable options to approve or reject the recommendation. In an example, the displayed recommendation can recommend muting the microphone 123. The displayed recommendation can include a selectable icon that, when selected by the conferencer 111, mutes the microphone 123. In another example, the control unit 130 can send a command that causes the computing system 120 to display a recommendation to lock the door 128, and a selectable icon that, when selected by the conferencer 111, locks the door 128. In some examples, the recommendation can be displayed in a user interface including a "yes" icon and a "no" icon, where selection of the "yes" icon causes the control unit 130 to perform the recommended action, and selection of the "no" icon causes the control unit 130 not to perform the recommended action.

In some examples, the control unit 130 can determine one or more actions based on the predicted interruption. The bulk actions can include a pre-determined set of actions to be taken for a given interruption. For example, a first set of bulk actions may apply to a potential interruption by an adult entering the office 103. The first set of bulk actions may include notifying the interrupting person 110, notifying the conferencer 111, locking the door 128, and illuminating 144 the warning light 124. A second set of bulk actions may apply to a potential interruption by a child entering the office. The second set of bulk actions may include notifying an adult other than the conferencer 111 and turning on a television set in the living room 104. A third set of bulk actions may apply to a potential interruption by a person ringing the doorbell. The third set of actions can include deactivating the doorbell and/or activating a filter of the microphone 123 to filter out frequencies associated with the doorbell chime. A fourth set of actions may apply to a potential interruption by an animal. The fourth set of actions can include, for example, opening a pet door and activating a filter of the microphone 123 to filter out frequencies associated with dog barking.

The control unit 130 can determine monitoring system actions 152 based on the confidence of the detected interruption. The actions can include sending notifications to users. For example, at an interruption confidence of fifty percent, the control unit 130 can determine to send a notification 134 to the person 110. At an interruption level of seventy percent, the control unit 130 can determine to send a notification 154 to the conferencer 111. At an interruption level of seventy-five percent, the control unit 130 can determine to lock 114 the door 128 by sending a command to the door lock 126.

The control unit 130 can determine monitoring system actions 152 based on tracking the person 110. For example, the predicted interruption can include an estimated path that the person 110 has taken through the property 102, an estimated current location of the person 110, a predicted path of the person 110, or any combination of these. The predicted interruption can include an estimated current location of the person 110 as being in the living room 104 of the property 102. Based on the estimated current location of the person 110 as being in the living room 104 of the property 102, the control unit 130 can determine monitoring system actions 152 that prevent the person 110 from entering the office 103. The monitoring system actions 152 can include, for example, shutting the door 128, locking the door 128, or both. Thus, the control unit 130 can perform actions in order to prevent the interruption.

In some examples, the control unit 130 can perform system actions 152 that include adjusting or configuring one or more devices at the property 102. The control unit 130 can adjust sensors and devices at the property via automation controls.

The control unit 130 may send a command to adjust a device at the property 102. For example, the control unit 130 can send a command to shut and lock doors at the property 102. In some examples, the control unit 130 can trigger an alarm or warning at the property 102, e.g., by illuminating 144 the warning light 124.

In an example scenario, a vehicle may approach the property 102. The control unit 130 can receive camera image data indicating that the vehicle has approached the driveway and a person has exited the vehicle. The control unit 130 can perform video analysis to determine that the person is not a resident of the property 102. The control unit 130 can determine, based on the camera image data, that the person exiting the vehicle is likely to ring the doorbell, and therefore that a potential conference interruption exists.

Based on determining that a potential conference interruption exists due to the likely ringing of the doorbell, the control unit 130 can perform one or more actions 152. In some examples, the actions can include muting the doorbell or reducing the volume of the doorbell. In some examples, the actions can include disabling the doorbell chime in the office 103 while the doorbell chime remains activated in other areas of the property 102. In some examples, the actions can include providing a notification to be displayed on the screen 118, where the notification indicates that the doorbell is likely to be rung or that the doorbell has been rung. The notification can be displayed on the screen 118 in addition to, or instead of, activating the doorbell chime. In some examples, the control unit 130 can identify one or more occupants of the property 102 who are not participating in the conference, and can provide the doorbell notification to a mobile device associated with each of the one or more occupants, while concealing the doorbell notification from the conferencer 111.

In some examples, the actions 152 can prevent the person 110 from entering the office 103. For example, the actions can include shutting the door to the office or locking the door 128 to the office. The control unit 130 can select actions to perform based on the identity of the person 110. For example, the control unit 130 can select a first set of actions to perform when the person 110 is an adult, and a second set of actions to perform when the person 110 is a child. As an example, the control unit 130 can select to lock the door 128 when the person 110 is an adult, and to leave the door 128 unlocked when the person 110 is a child.

In some examples, the control unit 130 can select actions to perform that enable other occupants of the property 102 to perform actions without assistance from the conferencer 111. For example, the system 100 can control restrictions to certain devices, websites, television channels, etc.

In an example, a child may require permission of the conferencer 111 before using a tablet computer. When the conferencer 111 is engaged in a conference, the control unit 130 can provide the conferencer 111 with options on the screen 118 that enable the conferencer 111 to control permissions for the child to use the tablet computer without disrupting the conference. Similarly, the system 100 may control a lock or unlock status of a dog door. When the conferencer 111 is engaged in a conference, the control unit 130 can provide the conferencer with options on the screen 118 that enable the conferencer 111 to control the lock/unlock status of the dog door without disrupting the conference.

In some examples, the system can be integrated as a part of conferencing software and/or as a chatbot. When the conferencer is participating in conference through a particular conferencing application, the control unit 130 can communicate with the conferencer through the conferencing application, e.g., through a chat messaging function of the conferencing application. For example, the conferencer may receive a chat message asking permission to unlock the dog door, with options for the conferencer to respond "yes" or "no."

The actions 152 can be performed to prevent the presence of the person 110 from interrupting the conference, or to minimize disruption to the conference caused by the person 110. For example, the actions 152 can include transmitting an instruction to the computing system 120 to adjust settings of the microphone, the camera, or both. In an example, the control unit 130 can transmit an instruction that mutes the microphone and/or turns off the camera. The control unit 130 can transmit the instruction prior to the person 110 entering the office, upon the person 110 opening the door 128, upon the person 110 entering the office, or after the person 110 enters the office.

In some examples, the actions can include adjusting one or more settings of the camera, e.g., by zooming the camera in or out. For example, the actions can include zooming the camera in on the conferencer 111 to reduce the amount of background scene that is visible to the camera. In some examples, the actions can include blurring the background scene of the camera. In some examples, the actions can include panning or tilting the camera away from the door 128. In some examples, the actions can include adjusting one or more settings of the microphone e.g., by reducing a volume of the microphone and/or by increasing background noise filtering of the microphone.

In some examples, the control unit 130 can select actions to perform based on the conference system data 122. For example, the control unit 130 can determine, using the conference data, whether or not the conferencer 111 is currently speaking into the microphone. Based on determining that the conferencer 111 is speaking into the microphone, the control unit 130 can determine not to turn off the microphone, and can determine instead to increase background noise filtering of the microphone. Based on determining that the conferencer 111 is not speaking into the microphone, the control unit 130 can determine to turn off the microphone.

In some examples, the control unit 130 can prompt the conferencer at an earlier step with options such as "Mute Microphone," "Snooze Prompts" and "Ignore," and can take action automatically at a later step only if the user has not responded to the prompt. Thus, in some examples, the control unit 130 can adjust devices at the property 102 without any user action.

In some examples, the control unit 130 can provide recommended actions to a user, and can perform the actions upon approval by the user. For example, the control unit 130 may provide recommended actions to a user such as the manager or owner of the property, and request approval of the actions. The user may be the conferencer 111 or another person. Upon approval of the actions, the monitoring server can perform the actions 152. In some examples, the control unit 130 can provide recommended actions to the user with a time limit. If the user does not respond to approve or deny the actions within the time limit, the control unit 130 may perform the actions 152.

The actions 152 can include sending an alert to users that includes the predicted time of the interruption, and the current location, route, speed of the person 110, and/or other information. The alert can also include details about the person 110 based on the sensor data 142, e.g., camera images from the camera 105.

In some examples, the actions 152 can signal to the person 110 that the conference is in progress in the office. For example, the actions 152 can include illuminating a warning light 124 near the door 128 to the office 103. The warning light 124 can be, for example, a red light and/or a blinking light. In some examples, the light can illuminate text, e.g., text that reads "on air" or "conference in progress." In some examples, the actions 152 can include broadcasting audio sounds. For example, the actions can include activating a speaker near the door 128. The speaker can broadcast audio sounds such as a beeping sound or a voice that informs the person 110 that a conference is in progress in the office 103. In some examples, the control unit 130 can send another notification to the person 110 when the conference is complete, indicating that the conference is complete.

The actions can include providing a notification 134 to a device associated with the interrupter. For example, the control unit 130 can identify the person 110 based on the sensor data, and can transmit the notification 134 to a mobile device 116 associated with the person 110. In some examples, the control unit 130 can transmit the notification 134 to a screen or panel that is near the person 110, e.g., a panel of the control unit 130 or a panel of an appliance. The notification 134 can include, for example, a message indicating that a conference is in progress in the office 103.

The actions 152 can be performed to warn the conferencer 111 of the predicted interruption. For example, the actions 152 can include transmitting a notification 154 to the computing system 120 and/or to a mobile device associated with the conferencer 111. The notification can include a message warning that the person 110 is approaching the door 128.

The notifications 134, 154 can include a message stating that a conference is in progress. The control unit 130 can send the notifications 134, 154 to residents or occupants via, for example, a text message that the occupants can receive on a mobile device, e.g., mobile device 116. The mobile device can be any type of data carrying computing device. For example, the mobile device can be a laptop computer, a tablet, smart watch, or a video game console, or a smart car. The control unit 130 can also send the notification to users via, for example, a telephone call.

Though described above as being performed by a particular component of system 100 (e.g., the control unit 130), any of the various control, processing, and analysis operations can be performed by the control unit 130, the sensors 140, or another computer system of the system 100. For example, the control unit 130, the sensors 140, or another computer system such as a monitoring server can analyze the images and data from the sensors 140 to predict an interruption. Similarly, the control unit 130, the sensors, or another computer system can control the various sensors, and/or the property automation controls, to collect data or control device operation.

The system 100 is an example of a system implemented as computer programs on one or more computers in one or more locations, in which the systems, components, and techniques described in this specification are implemented. The user devices mobile device 116, computing system 120, and others can include personal computers, mobile communication devices, and other devices that can send and receive data over a network. The network (not shown), such as a local area network ("LAN"), wide area network ("WAN"), the Internet, or a combination thereof, connects the user devices to the system 100. The system 100 can use a single server computer or multiple server computers operating in conjunction with one another, including, for example, a set of remote computers deployed as a cloud computing service.

The system 100 can include several different functional components, including the control unit 130, or the sensors 140, or a combination of these, can include one or more data processing apparatuses, can be implemented in code, or a combination of both. For instance, each of the control unit 130, or the sensors 140 can include one or more data processors and instructions that cause the one or more data processors to perform the operations discussed herein.

The various functional components of the system 100 can be installed on one or more computers as separate functional components or as different modules of a same functional component. For example, the components the control unit 130, or the sensors 140 of the system 100 can be implemented as computer programs installed on one or more computers in one or more locations that are coupled to each through a network. In cloud-based systems for example, these components can be implemented by individual computing nodes of a distributed computing system.

Figure 2A:
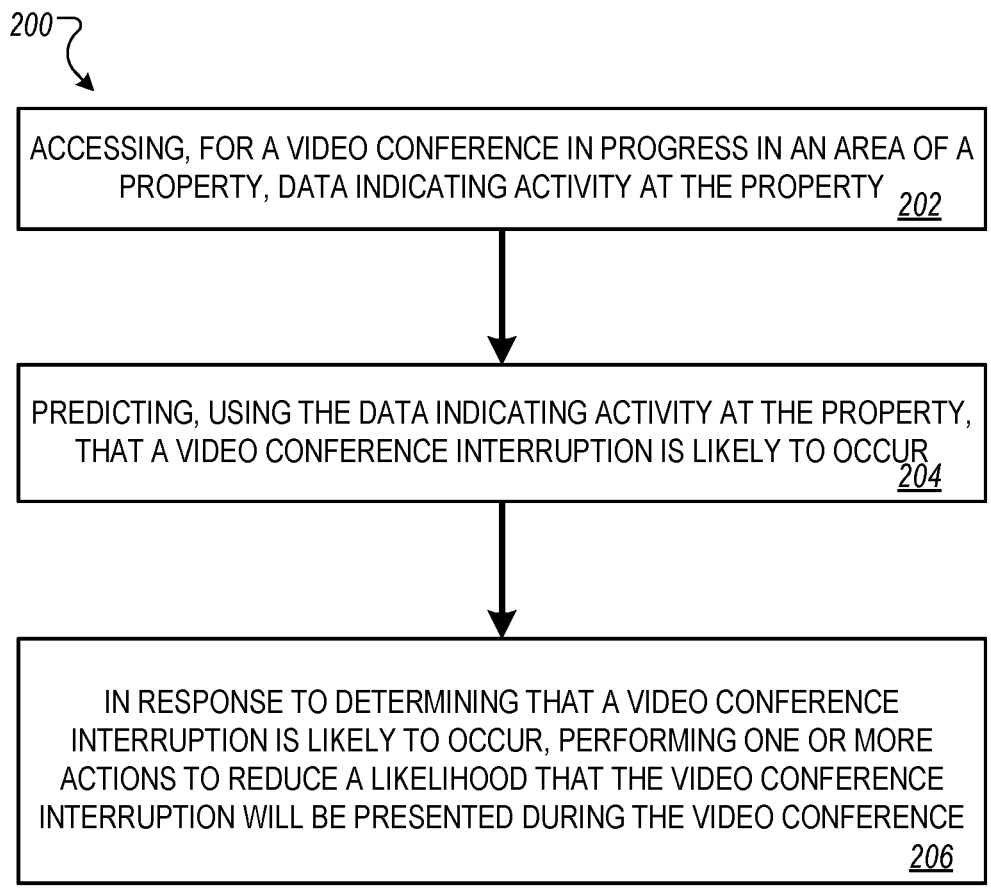
FIGS. 2A and 2B are flow diagrams illustrating an example process for predicting and preventing conference interruptions.

FIG. 2A is a flow diagram illustrating an example process 200 for conference interruption prediction and prevention and response based on property monitoring. In some implementations, some or all of the process can be performed by a control unit, e.g., control unit 130 of the system 100, or by another computer system located at the monitored property 102 or at another location.

Briefly, process 200 includes accessing, for a video conference in progress in an area of a property, data indicating activity at the property (202), predicting, using the data indicating activity at the property, that a video conference interruption is likely to occur (204), and in response to determining that a video conference interruption is likely to occur, performing one or more actions to reduce a likelihood that the video conference interruption will be presented during the video conference (206), In more detail, the process 200 includes accessing, for a video conference in progress in an area of a property, data indicating activity at the property (202). For example, the control unit 130 can obtain conferencing system data 122 indicating that a video conference is in progress in the office 103 of the property 102. The conferencing system data 122 includes data indicating that the conference application is open, the calendar status is busy, the webcam is on, the microphone is on, and the speaker is on. The conferencing system data 122 includes data indicating that the computing system 120 is located in the office 103 of the property 102. Data indicating activity at the property can include any appropriate data. For example, the control unit 130 can obtain sensor data 142 indicating that the person 110 has entered the property 102 and is approaching the office 103. The sensor data 142 includes data indicating that the front door sensor has detected the front door 106 opening and shutting, the office door lock sensor detects that the door 128 is unlocked, and the person 110 is approaching the office 103.

The process 200 includes, predicting, using the data indicating activity at the property, that a video conference interruption is likely to occur (204). For example, based on determining that the conference is in progress in the office, and that the person 110 is approaching the office, the control unit 130 can determine that a video conference interruption is likely to occur.

The process 200 includes, based on determining that a video conference interruption is likely to occur, performing one or more actions to prevent the interruption (208). For example, based on determining that a video conference interruption is likely to occur, the control unit 130 can perform actions 152 to prevent the interruption. For example, the control unit 130 can perform actions of locking 114 the office door 128, sending a notification to the conferencer 111 and/or the person 110, and illuminating 144 the warning light 124.

The order of steps in the process 200 described above is illustrative only, and 200 can be performed in different orders. For example, accessing the data indicating activity at the property (202) can occur again after predicting that the video conference interruption is likely to occur (204), after performing the one or more actions to reduce a likelihood that the video conference interruption will be presented during the video conference (206), or both.

In some implementations, the process 200 can include additional steps, fewer steps, or some of the steps can be divided into multiple steps. For example, the step accessing, for a video conference in progress in an area of a property, data indicating activity at the property (202) can be split into detecting a conference is occurring and detecting other activity at a property. In some examples, the process 200 can include on or more steps from the process 210, described in more detail below.

Figure 2B:
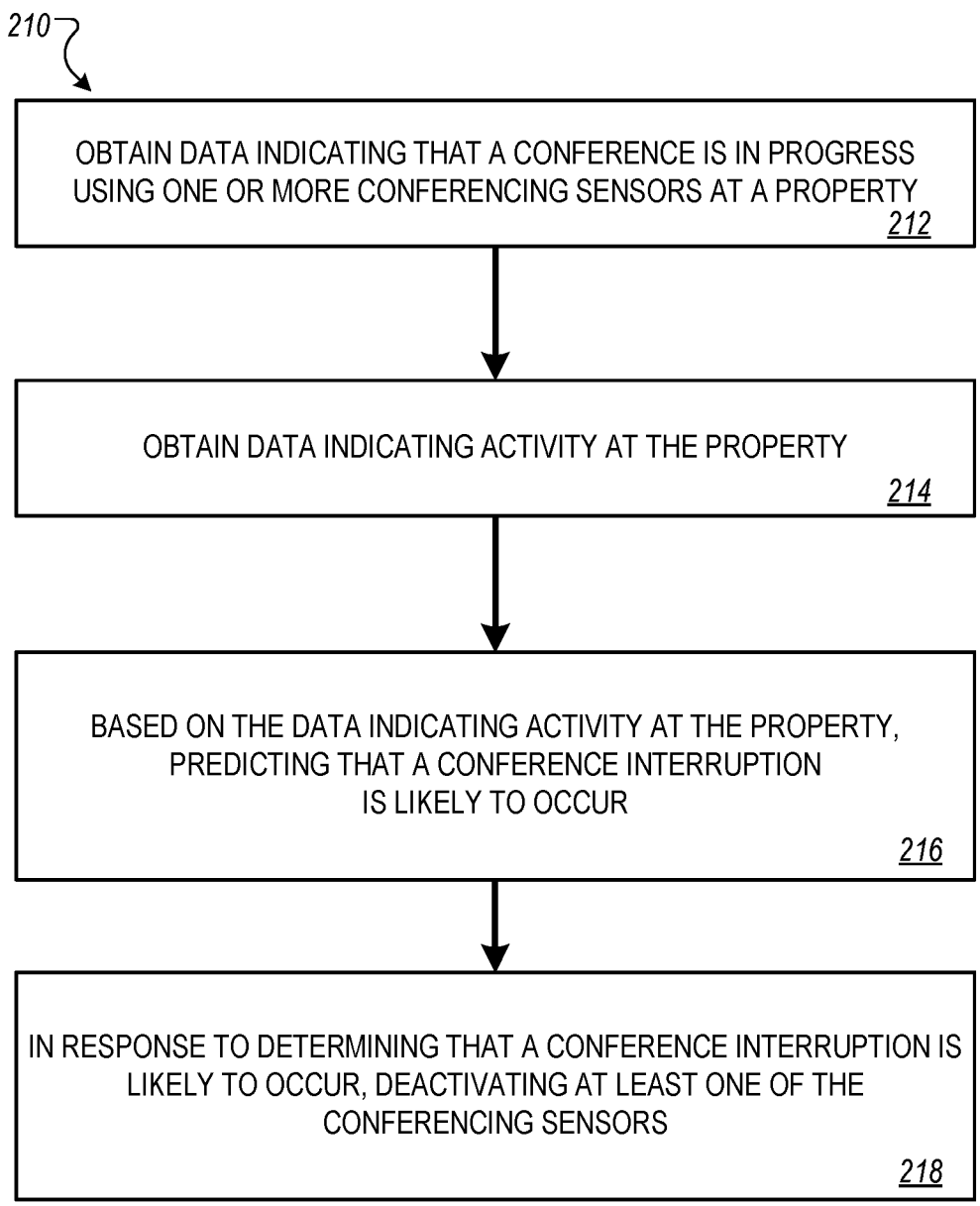

FIG. 2B is a flow diagram illustrating an example process 210 for conference interruption prediction and prevention and response based on property monitoring. In some implementations, some or all of the process can be performed by a control unit, e.g., control unit 130 of the system 100, or by another computer system located at the monitored property 102 or at another location.

Briefly, process 210 includes obtaining data indicating that a conference is in progress using one or more conferencing sensors at a property (212), obtaining data indicating activity at the property (214), based on the data indicating activity at the property, predicting that a conference interruption is likely to occur (216), and in response to determining that a conference interruption is likely to occur, deactivating at least one of the conferencing sensors (218).

In more detail, the process 210 includes obtaining data indicating that a conference is in progress using one or more conferencing sensors at a property (212). For example, the control unit 130 can obtain data indicating that a conference is in progress using the microphone 123 and the webcam 108.

The process 210 includes obtaining data indicating activity at the property (214). For example, the control unit 130 can obtain sensor data 142 indicating activity at the property 102.

The process 210 includes based on the data indicating activity at the property, predicting that a conference interruption is likely to occur (216). For example, based on the activity at the property 102, the control unit 130 can predict that a conference interruption is likely to occur.

The process 210 includes, in response to determining that a conference interruption is likely to occur, deactivating at least one of the conferencing sensors (218). For example, based on determining that a conference interruption is likely to occur, the control unit 130 can deactivate at least one of the microphone 123 or the webcam 108.

The order of steps in the process 210 described above is illustrative only, and 210 can be performed in different orders. For example, the obtaining the data indicating activity at the property (214) can occur before obtaining the data indicating that a conference is in progress using the one or more conferencing sensors at the property (212).

In some implementations, the process 210 can include additional steps, fewer steps, or some of the steps can be divided into multiple steps. For example, the step obtaining data indicating activity at the property (214), obtaining data indicating that a conference is in progress using one or more conferencing sensors at a property (212), or both, can occur again after the step predicting that a conference interruption is likely to occur (216). The step obtaining data indicating activity at the property (214) can be omitted.

Figure 3:
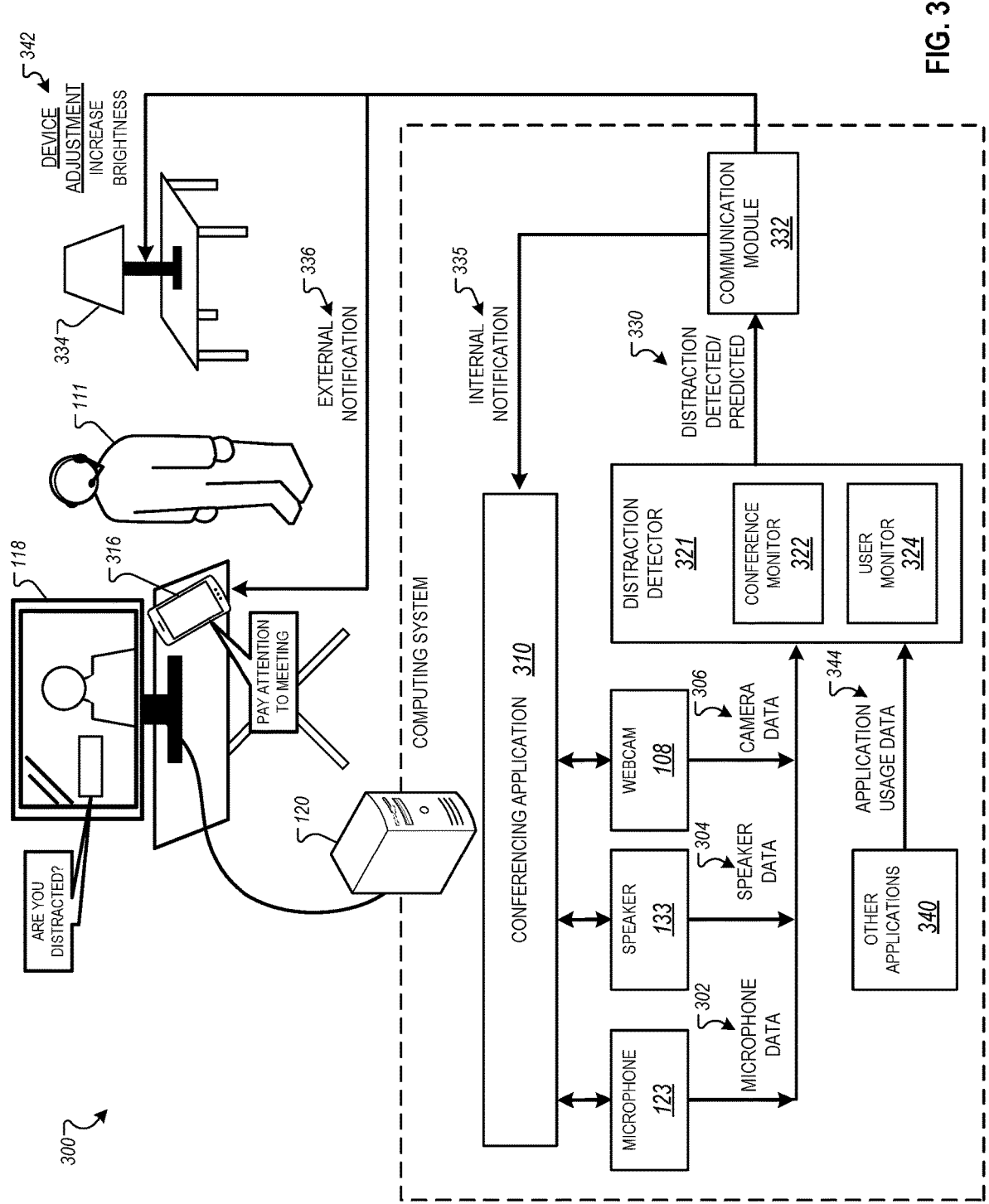
FIG. 3 is a diagram illustrating an example system for conference distraction monitoring.

FIG. 3 shows an example system for conference distraction monitoring. The system includes a computing system 120. The computing device can be a computer that operates a conferencing application 310 and other applications 340. The computing device can be, for example, a laptop computer, desktop computer, tablet, or mobile device.

The system 300 can monitor for conference distraction and fatigue. The system 300 includes a webcam 108, a microphone 123, and a speaker 133. In some examples, the system can receive data from external sensors, such as cameras, motion sensors, and microphones.

The system 300 includes a distraction detector 321. The distraction detector 321 includes a user monitor 324 and a conference monitor 322. The user monitor 324 can monitor the user for indications of distraction. The conference monitor 322 can monitor an in-progress conference for indications of distraction and for conditions that are likely to cause user fatigue and distraction. Based on monitoring the user and monitoring the conference, the distraction detector can detect and/or predict distractions 330.

The user monitor 324 can monitor behavior of the conferencer 111 using data from the webcam 108, the microphone 123, and the other applications 340. In some examples, the user monitor 324 can compare user behavior to predicted user behavior. In some examples, the user monitor 324 can store data indicating a layout of the conferencer's computer workstation. The model can include, for example, a position of the webcam in relation to the screen 118 or multiple screens. The model of the computer workstation can be established upon setup of the computing device and/or can be developed over time. For example, the user monitor 324 can determine that when the conferencer 111 is engaged in a conference, the conferencer's eyes are directed at a particular location of the screen 118. The user monitor 324 can determine that when the conferencer 111 is distracted, the conferencer's eyes are directed to the side, e.g., towards a window of the office 103, or downwards, e.g., towards a mobile device in the conferencer's hands.

In some examples, the predicted user behavior can be based on a global model. For example, the user monitor 324 can store a global model that represents general user behavior when users are distracted during a conference. The user monitor 324 can refine the user behavior model over time based on observations of the conferencer 111. The user monitor 324 can refine the user behavior model, e.g. using machine learning methods.

The user monitor 324 can learn to predict fatigue and distraction, e.g., based on self-reporting by the conferencer 111. For example, the conferencing application 310 can provide periodic or end-of-meeting polling to determine a level of fatigue of the conferencer 111.

The user monitor 324 can develop a fatigue detection model over time based on observed user behaviors. For example, the user monitor 324 can compare user behavior observed in the camera data 306 and microphone data 302 to reported fatigue levels of participants to identify user behaviors that cause fatigue or are correlated with increasing levels of fatigue.

The user monitor 324 can receive application usage data 344 from other applications 340 run by the computing system 120. The other applications 340 can include, e.g., a web browsing application, a note-taking application, and/or other types of applications. The application usage data 344 can include, for example, data indicating the types of applications that are in use by the conferencer 111. In some examples, the application usage data 344 can include data indicating interactions of the conferencer 111 with the other applications 340. For example, the application usage data 344 can include data indicating whether the conferencer 111 is typing notes into the note-taking application. The user monitor 324 can determine that the conferencer 111 is engaged based on the conferencer 111 typing notes into the note-taking application. The user monitor 324 can determine a degree of relevance between subject matter of the notes being typed and the contents of the meeting as a measure of attention of the conferencer 111.

The application usage data 344 can include data indicating whether the conferencer 111 is performing tasks unrelated to the conference. For example, the user monitor 324 can determine that the conferencer 111 is distracted based on the conferencer 111 using other applications 340 to perform searches in a web browser, view a social media website, watch videos, listen to music, etc.

The user monitor 324 can track eye movement of the user using image data from the camera. For example, the user monitor can determine a location on the screen 118 where the conferencing application is displayed. In some examples, the computing system 120 can include more than one screen. The user monitor can determine a particular screen on which the conferencing application window is displayed, and a location on the particular screen where the conferencing application window is displayed.

In some examples, the user monitor 324 can determine whether the conferencer 111 is making eye contact with a speaking participant of the conference. For example, the user monitor 324 can determine a window in which the speaking participant is located, and a position of the window on the screen 118. The user monitor 324 can determine whether the conferencer's eyes are looking at the window in which the speaking participant is located. In some examples, the user monitor 324 can determine that the conferencer 111 is engaged in the conference based on the conferencer 111 looking towards the speaking participant, or looking towards the webcam 108. The user monitor 324 may determine that the conferencer 111 is distracted based on the conferencer 111 looking away from the speaking participant and away from the webcam 108.

In some examples, the webcam 108 can store data mapping an eye direction of the conferencer 111 to a location of the screen 118. For example, upon installation of the webcam 108, the camera can undergo a calibration phase. During the calibration phase, the webcam 108 can capture images of the conferencer 111 as the conferencer looks at different positions on the screen 118. The webcam 108 can then store calibration data mapping images of the conferencer to the locations on the screen at which the user was looking. This can be an explicit guided calibration step or performed in the background as the conferencer is actively interacting with the interface. For example, the user monitor 324 might assume the focus of the conferencer's eyes when the conferencer 111 clicks on a target such as a button on the screen 118.

In some examples, the user monitor 324 can determine whether the conferencer 111 is distracted based on determining a level of participation of the conferencer 111. The user monitor 324 can compare the level of participation of the conferencer 111 to an expected level of participation of the conferencer. The level of participation can include, for example, an amount of time that the conferencer 111 is speaking during the conference. The user monitor 324 can determine an expected level of participation at least in part based on a number of conference participants. For a larger number of participants, the expected level of participation of the conferencer 111 may be less than for a smaller number of participants.

In some examples, the user monitor 324 can determine whether the conferencer 111 is distracted based on analyzing camera data 306 from the webcam 108 to perform eye analysis, including blink-rate and pupilometry. The eye analysis can include determining a frequency at which the conferencer 111 moves his or her eyes from the webcam 108 to the conference window on the screen 118.

The user monitor 324 can also analyze camera data 306 to detect signs of fatigue. For example, the user monitor 324 can perform facial analysis to determine a level of attention and interest of the conferencer 111. The user monitor 324 can also analyze the camera data 306 to perform analysis of the posture of the conferencer 111. The user monitor 324 can detect other signs of fatigue, e.g., images of the conferencer 111 drinking coffee or rubbing eyes.

In some examples, the user monitor 324 can determine whether the conferencer 111 is distracted or fatigued based on analyzing microphone data 302 from the microphone 123 to perform voice analysis, including analyzing volume of speech, voice frequency, speed of speech, and/or other speech characteristics of the conferencer 111.

The conference monitor 322 can monitor the conference for indications of conditions that are likely to cause distraction or fatigue. Conditions that are likely to cause distraction or fatigue can include, for example, poor video quality, poor audio quality, a lag between a speaker talking and a listener hearing the speech, a lag between audio and video of the conference, etc. The conference monitor 322 monitors the conference for indications of conditions that are likely to cause fatigue based on monitoring microphone data 302 from the microphone 123, speaker data 304 from the speaker 133, and camera data 306 from the webcam 108.

Videoconferencing tools sometimes have audio/video synchronization problems that can cause user fatigue. The conference monitor 322 can monitor the conference for audio and video delays. For example, the conference monitor 322 can compare a time of audio input to the computing device to a time of audio output by the computing device, e.g., through the speakers. The conference monitor can determine that a condition for user fatigue exists based on a delay between the audio input and the audio output existing. In some examples, the conference monitor can determine that a condition for user fatigue exists based on a delay exceeding a threshold delay.

In some examples, the conference monitor 322 can compare a time of video display to a time of corresponding audio output. For example, the conference monitor can receive image data of the screen 118 and audio data representing audio output by the speakers. The conference monitor can compare a time of video output on the screen 118 to a time of corresponding audio output by the speakers 133. Corresponding audio and video can be, for example, audio and video that are received by the computing device at the same time and/or audio and video having a same timestamp. The conference monitor can determine that a condition for user fatigue exists based on a delay between the audio and video of the conference. In some examples, the conference monitor can determine that a condition for user fatigue exists based on a delay exceeding a threshold delay.

In some examples, the conference monitor 322 can monitor the conference for signs of delays between a first participant speaking and second participant hearing the speech. Signs of delays can include overtalk or crosstalk between multiple participants. Signs of delays can also include participants beginning to speak and then stopping. The conference monitor 322 can monitor for delays based on microphone data 302 from the microphone 123 and speaker data 304 from the speaker 133.

The conference monitor 322 can also monitor for indications of conditions that are likely to cause fatigue based on monitoring application usage data 344 from other applications 340. For example, the other applications 340 can include a calendar application. The conference monitor 322 can determine, based on application usage data 344 from the calendar application, a conference schedule for the conferencer 111. The conference monitor 322 may predict 320 a distraction based on a number of conferences or a frequency of conferences scheduled in the calendar application.

The conference monitor 322 can learn to predict fatigue and distraction, e.g., based on self-reporting by the conferencer 111 and other conference participants. For example, the conferencing application 310 can provide periodic or end-of-meeting polling to determine a level of fatigue of the conference participants.

The conference monitor 322 can develop a fatigue detection model over time based on observed conference conditions and behaviors. For example, the conference monitor 322 can compare conference conditions to reported fatigue levels of participants to identify conference conditions that cause fatigue.

The system 300 can perform one or more actions based on predicting 330 user fatigue or distraction. The computing system 120 can include a communication module 332. The communication module 332 can communicate internally, e.g., with the conferencing application 310. The communication module 332 can communicate externally, e.g., with the control unit 130, with the mobile device 316, and/or with devices at the property 102 such as a light 334.

The distraction detector 321 outputs an indication of a detected or predicted distraction 330 to the communication module 332. Based on receiving the indication of the detected or predicted distraction, the communication module 332 can communicate with devices and applications in order to perform actions to prevent or mitigate the detected fatigue.

In some examples, the actions can be performed to attract the attention of the user to the conference. For example, the actions can include displaying a notification on the screen 118 and/or on a display of a mobile device 316 associated with the conferencer 111. In some examples, the notification can include text asking the user if he or she is distracted, or reminding the user to pay attention to the conference. In some examples, the actions include flashing a light or sound to attract the attention of the user. For example, the screen can display a flashing light, the speakers 133 can broadcast an alert sound while the microphone 123 is temporarily muted, or both. In some examples, based on the distraction detector 321 detecting fatigue, the conferencing application 310 can offer 5-minute "pay attention" reminders until the end of the conference.

In some examples, the communication module can output an internal notification 335 to the conferencing application 310. The internal notification 335 can include a message that fatigue is detected or predicted. Based on receiving the internal notification 335, the conferencing application 310 can perform an operation to prevent the fatigue or to draw the attention of the conferencer 111 to the conference. For example, the conferencing application 310 can present a notification to the conferencer 111, e.g., by displaying the notification on the screen 118.

In some examples, the conferencing application 310 can suggest a break in the conference. In some examples, the conferencing application 310 can deactivate the microphone 123, the webcam 108, or both. In some examples, the conferencing application 310 can deactivate the video view for the conferencer 111 or for all participants, e.g., switching the conference from a video conference to an audio-only conference.

In some examples, the conferencing application 310 can propose a conference modification to a conference leader before making modifications to the conference. For example, the conferencing application 310 can present a proposal to the conference leader that suggests taking a break or suggests switching to an audio-only conference. The conferencing application 310 can provide a selectable option that allows the conference leader to authorize the conference modification or to reject the conference modification.

In some examples, based on the distraction detector detecting fatigue, the conferencing application 310 can offer a voting process to determine a number of participants that would like to take a break. In some examples, the conferencing application can use weighted voting. For example, each participant's conferencing application can present a report indicating an amount of fatigue from the participants, and the conference leader can determine whether a break is necessary.

Both the voting process and the conference analysis can be anonymized such that participants who are distracted or fatigued are not identified. The conferencing application can inject random data, votes, or results into the mix in order to avoid direct correlations of results to certain participants. Since the conferencing application is monitoring the conference and conversation cadence, the conferencing application can time breaks or break suggestions with pauses in the discussion. Likewise, the conferencing application can wait until a participant is finished speaking before turning off their webcam or muting their mic.

In some examples, the communication module 332 can output an external notification 336. The external notification 336 can be output to a device such as the mobile device 316 associated with the conferencer 111. The external notification can include, for example, a flashing light or a text notification reminding the conferencer 111 to pay attention to the conferencer. In some example, the user monitor 324 may determine that the conferencer 111 is distracted by the mobile device 316. In these examples, the external notification 336 can disable the mobile device 316 or can disable a subset of application on the mobile device, e.g., social media or entertainment applications.

The actions can include adjusting one or more devices at the property. For example, the computing device can communicate with devices such as lighting and speakers located at the property. In an example, the computing device can transmit an instruction to a light 334 that causes the light 334 to turn on or to increase a brightness level. In some examples, the computing system 120 can transmit an instruction to a speaker that causes the speaker to broadcast a sound to attract the attention of the user.

In some examples, the communication module 332 can output a device adjustment 342 that causes an adjustment to one or more devices at the property 102. In some examples, the communication module 332 can output a message to the control unit 130, and the control unit 130 can perform the device adjustment 342.

The device adjustment 342 can include, for example, adjusting one or more devices such as a light 334. The device adjustment 342 can include increasing brightness of the light 334. In some examples, the device adjustment 342 can include decreasing brightness of the light 334 or turning on or off the light. In some examples, the device adjustment 342 can include adjusting a thermostat. For example, the device adjustment 342 can include reducing temperature of the office 103 by lowering a thermostat.

In the example of FIG. 3, the computing system 120 performs actions of turning off the microphone and the camera, sending a notification to the mobile device 316, and sending a command to the light 334 to turn the light 334 on. The actions also include adjusting the microphone 123 and the webcam 108. For example, based on determining that the conferencer 111 is distracted or fatigued, the actions can include turning off the microphone 123, turning off the webcam 108, or both.

In some examples, the actions may be overridden by the conferencer 111 after the actions are performed. In these examples, the computing system 120 can detect that the action was overridden and determine that the action was unnecessary or unwanted. The computing system 120 can therefore avoid taking the same action in the future, and/or the computing system can update its model of indications that the conferencer 111 was truly fatigued. The timing of overriding the action can be taken into account. For example, in determining that the action was unwanted, the conferencer 111 immediately raising the thermostat could be weighted more heavily than the conferencer 111 raising the thermostat twenty minutes after the action was taken to lower the thermostat.

In some examples, the conferencer 111 can be presented with controls and feedback options to assist the computing system 120 with learning when the conferencer 111 is fatigued or distracted. For example, the conferencer 111 can provide feedback indicating that the conferencer 111 was not tired prior to the action of increasing brightness of the light 334. In another example, the conferencer 111 can provide feedback indicating that the conferencer 111 was tired prior to the action of increasing brightness of the light 334, but that the increased brightness level of the light 334 was too bright.

The system 300 is an example of a system implemented as computer programs on one or more computers in one or more locations, in which the systems, components, and techniques described in this specification are implemented. The user devices mobile device 316, computing system 120, and others can include personal computers, mobile communication devices, and other devices that can send and receive data over a network. The network (not shown), such as a local area network ("LAN"), wide area network ("WAN"), the Internet, or a combination thereof, connects the user devices to the system 300. The system 300 can use a single server computer or multiple server computers operating in conjunction with one another, including, for example, a set of remote computers deployed as a cloud computing service.

The system 300 can include several different functional components, including the distraction detector 321, the communication module 332, the conference application 310, and the other applications 340. The distraction detector 321, the communication module 332, the conference application 310, the other applications 340, or a combination of these, can include one or more data processing apparatuses, can be implemented in code, or a combination of both. For instance, each of the distraction detector 321 and the communication module 332 can include one or more data processors and instructions that cause the one or more data processors to perform the operations discussed herein.

The various functional components of the system 300 can be installed on one or more computers as separate functional components or as different modules of a same functional component. For example, the components distraction detector 321 and the communication module 332 of the system 300 can be implemented as computer programs installed on one or more computers in one or more locations that are coupled to each through a network. In cloud-based systems for example, these components can be implemented by individual computing nodes of a distributed computing system.

Figure 4:
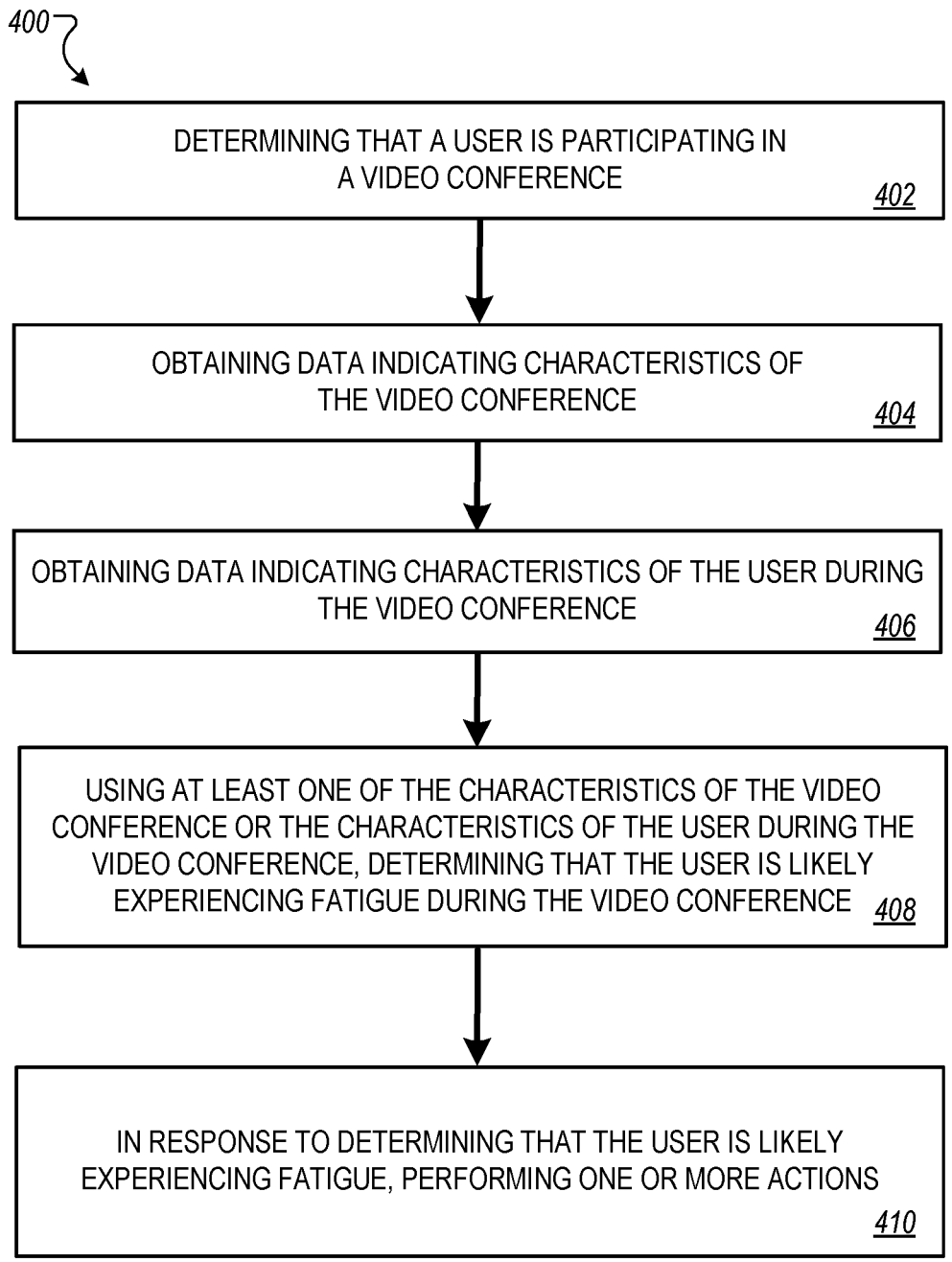
FIG. 4 is a flow diagram illustrating an example process for predicting and preventing conference distractions.

FIG. 4 is a flow diagram illustrating an example process 400 for conference distraction detection and mitigation and response based on property monitoring. In some implementations, some or all of the process can be performed by a control unit, e.g., control unit 130 of the system 100, or by another computer system located at the monitored property 102 or at another location.

Briefly, process 400 includes determining that a user is participating in a video conference (402), obtaining data indicating characteristics of the video conference (404), obtaining data indicating characteristics of the user during the video conference (406), using at least one of the characteristics of the video conference or the characteristics of the user during the video conference, determining that the user is likely experiencing fatigue during the video conference (408), and in response to determining that the user is likely experiencing fatigue, performing one or more actions (410).

In more detail, the process 400 includes determining that a user is participating in a video conference (402). For example, the computing system 120 can determine that the conferencer 111 is participating in a video conference using the conferencing application 310, the microphone 123, the screen 118, and the webcam 108.

The process 400 includes obtaining data indicating characteristics of the video conference (404). For example, the conference monitor 322 of the computing system 120 can obtain microphone data 302, speaker data 304, and camera data 306 indicating characteristics of the video conference.

The process 400 includes obtaining data indicating characteristics of the user during the video conference (406). For example, the user monitor 324 can obtain microphone data 302, camera data 306, and application usage data 344 indicating characteristics of the conferencer 111 during the video conference.

The process 400 includes, using at least one of the characteristics of the video conference or the characteristics of the user during the video conference, determining that the user is likely experiencing fatigue during the video conference (408). For example, based on the characteristics of the conference or the characteristics of the conferencer 111, the distraction detector can determine that the conferencer 111 is likely experiencing fatigue.

The process 400 includes in response to determining that the user is likely experiencing fatigue, performing one or more actions (410). For example, based on determining that the conferencer is likely experiencing fatigue, the communication module 332 can output at least one of an internal notification 335, an external notification 336, or a device adjustment 342.

The order of steps in the process 400 described above is illustrative only, and 400 can be performed in different orders. For example, the determining that a user is participating in a video conference (402), obtaining data indicating characteristics of the video conference (404), and obtaining data indicating characteristics of the user during the video conference (406) can be performed in various orders.

In some implementations, the process 400 can include additional steps, fewer steps, or some of the steps can be divided into multiple steps. For example, the obtaining data indicating characteristics of the video conference (404) or obtaining data indicating characteristics of the user during the video conference (406), or both, can be omitted.

Figure 5:
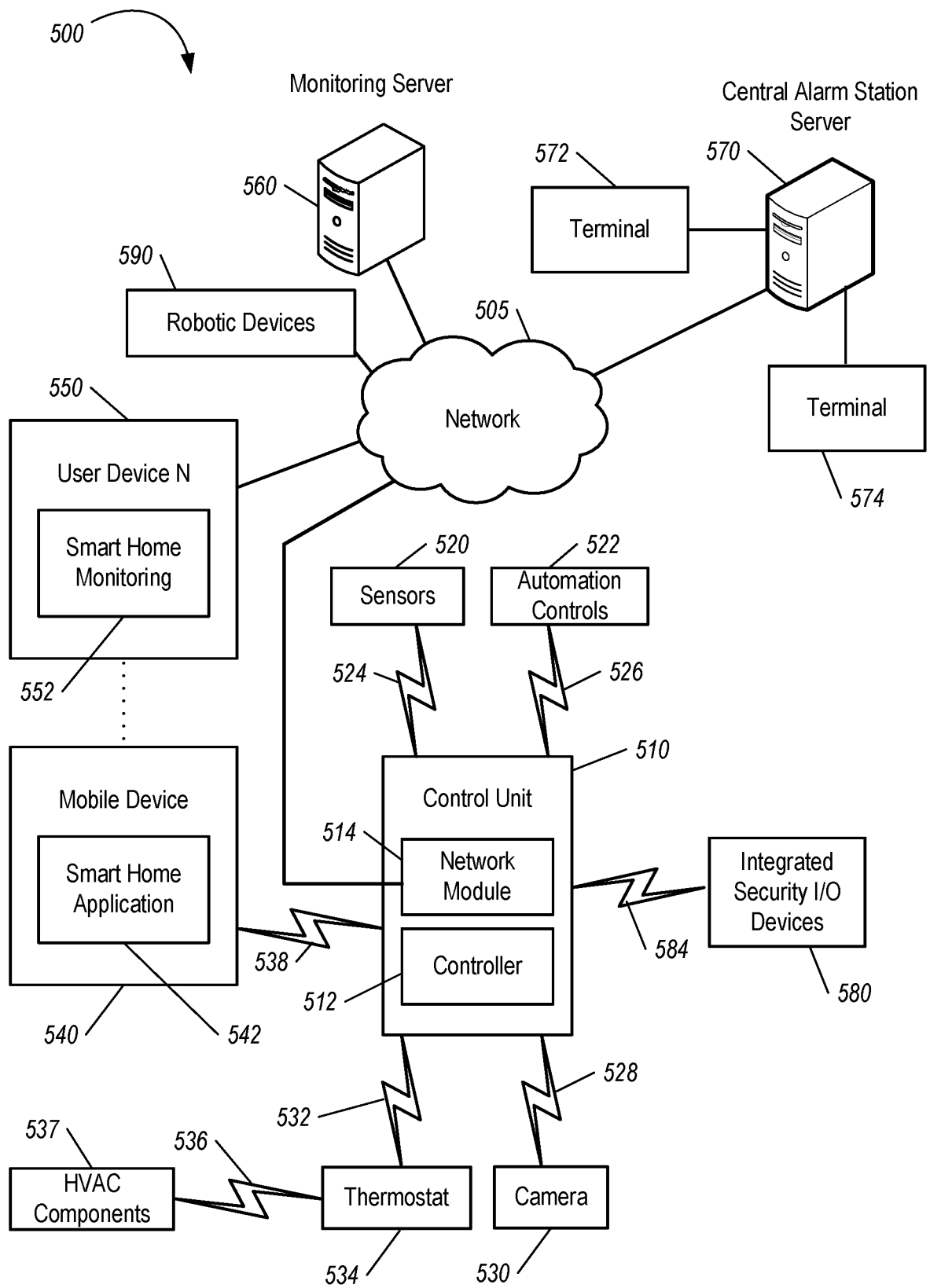
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associate with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534 via the communication link 536.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., conferencer 111). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
accessing, for a video conference of a first device in an area of a property and using device data captured by a second device at the property and that is not directly coupled to the first device, data indicating activity at the property that is not part of the video conference;
predicting, using the data indicating activity at the property that is not part of the video conference, that a video conference interruption is likely to occur given the activity at the property that is not part of the video conference; and
in response to determining that a video conference interruption is likely to occur given the activity at the property that is not part of the video conference and before the video conference interruption occurs, performing one or more actions to reduce a likelihood that the video conference interruption will be presented during the video conference by a third device that is in network communication with the first device.

2. The method of claim 1, comprising accessing data indicating that the video conference is in progress in the area of the property, wherein accessing the data indicating the activity at the property that is not part of the video conference is responsive to accessing the data indicating that the video conference is in progress in the area of the property.

3. The method of claim 1, wherein performing the one or more actions to reduce the likelihood that the video conference interruption will be presented during the video conference comprises performing one or more actions that have at least a threshold likelihood of preventing the video conference interruption.

4. The method of claim 3, wherein performing the one or more actions comprises sending an instruction to a smart device to cause the smart device to reduce the likelihood of the video conference interruption.

5. The method of claim 4, wherein sending the instruction to the smart device comprises sending the instruction to a network connected door to cause the door to lock to reduce a likelihood of the video conference interruption.

6. The method of claim 1, wherein performing the one or more actions to reduce the likelihood that the video conference interruption will be presented during the video conference comprises deactivating at least one sensor used for the video conference.

7. The method of claim 6, wherein deactivating the at least one sensor comprises deactivating one of a camera or a speaker for the video conference.

8. The method of claim 1, wherein predicting that the video conference interruption is likely to occur given the activity at the property that is not part of the video conference comprises:
determining, using the data indicating activity at the property that is not part of the video conference, a predicted path of a person at the property; and
predicting, using the predicted path of the person at the property, that the video conference interruption is likely to occur.

9. The method of claim 1, wherein performing the one or more actions to reduce the likelihood that the video conference interruption will be presented during the video conference comprises performing one or more actions to reduce a likelihood that the video conference interruption will be presented audibly or visibly during the video conference.

10. The method of claim 1, wherein performing the one or more actions to reduce the likelihood that the video conference interruption will be presented during the video conference comprises:
determining, for each of a plurality of actions, an action likelihood that the action will reduce the likelihood that the video conference interruption will be presented during the video conference; and
selecting, using the plurality of action likelihoods, the one or more actions to perform.

11. One or more non-transitory computer storage media encoded with instructions that, when executed by one or more computers, cause the one or more computers to perform operations comprising:
accessing, for a video conference of a first device in an area of a property and using device data captured by a second device at the property and that is not directly coupled to the first device, data indicating activity at the property that is not part of the video conference;
predicting, using the data indicating activity at the property that is not part of the video conference, that a video conference interruption is likely to occur given the activity at the property that is not part of the video conference; and in response to determining that a video conference interruption is likely to occur given the activity at the property that is not part of the video conference and before the video conference interruption occurs, performing one or more actions to reduce a likelihood that the video conference interruption will be presented during the video conference by a third device that is in network communication with the first device.

12. The computer storage media of claim 11, the operations comprising accessing data indicating that the video conference is in progress in the area of the property, wherein accessing the data indicating the activity at the property that is not part of the video conference is responsive to accessing the data indicating that the video conference is in progress in the area of the property.

13. A system comprising one or more computers and one or more storage devices on which are stored instructions that are operable, when executed by the one or more computers, to cause the one or more computers to perform operations comprising:

accessing, for a video conference of a first device in an area of a property and using device data captured by a second device at the property and that is not directly coupled to the first device, data indicating activity at the property that is not part of the video conference;

predicting, using the data indicating activity at the property that is not part of the video conference, that a video conference interruption is likely to occur given the activity at the property that is not part of the video conference; and in response to determining that a video conference interruption is likely to occur given the activity at the property that is not part of the video conference and before the video conference interruption occurs, performing one or more actions to reduce a likelihood that the video conference interruption will be presented during the video conference by a third device that is in network communication with the first device.

14. The system of claim 13, the operations comprising accessing data indicating that the video conference is in progress in the area of the property, wherein accessing the data indicating the activity at the property that is not part of the video conference is responsive to accessing the data indicating that the video conference is in progress in the area of the property.

15. The system of claim 13, wherein performing the one or more actions to reduce the likelihood that the video conference interruption will be presented during the video conference comprises performing one or more actions that have at least a threshold likelihood of preventing the video conference interruption.

16. The system of claim 15, wherein performing the one or more actions comprises sending an instruction to a smart device to cause the smart device to reduce the likelihood of the video conference interruption.

17. The system of claim 16, wherein sending the instruction to the smart device comprises sending the instruction to a network connected door to cause the door to lock to reduce a likelihood of the video conference interruption.

18. The system of claim 13, wherein performing the one or more actions to reduce the likelihood that the video conference interruption will be presented during the video conference comprises deactivating at least one sensor used for the video conference.

19. The system of claim 18, wherein deactivating the at least one sensor comprises deactivating one of a camera or a speaker for the video conference.

20. The system of claim 13, wherein predicting that the video conference interruption is likely to occur given the activity at the property that is not part of the video conference comprises:

determining, using the data indicating activity at the property that is not part of the video conference, a predicted path of a person at the property; and predicting, using the predicted path of the person at the property, that the video conference interruption is likely to occur.

* * * * *